Patented Sept. 29, 1925.

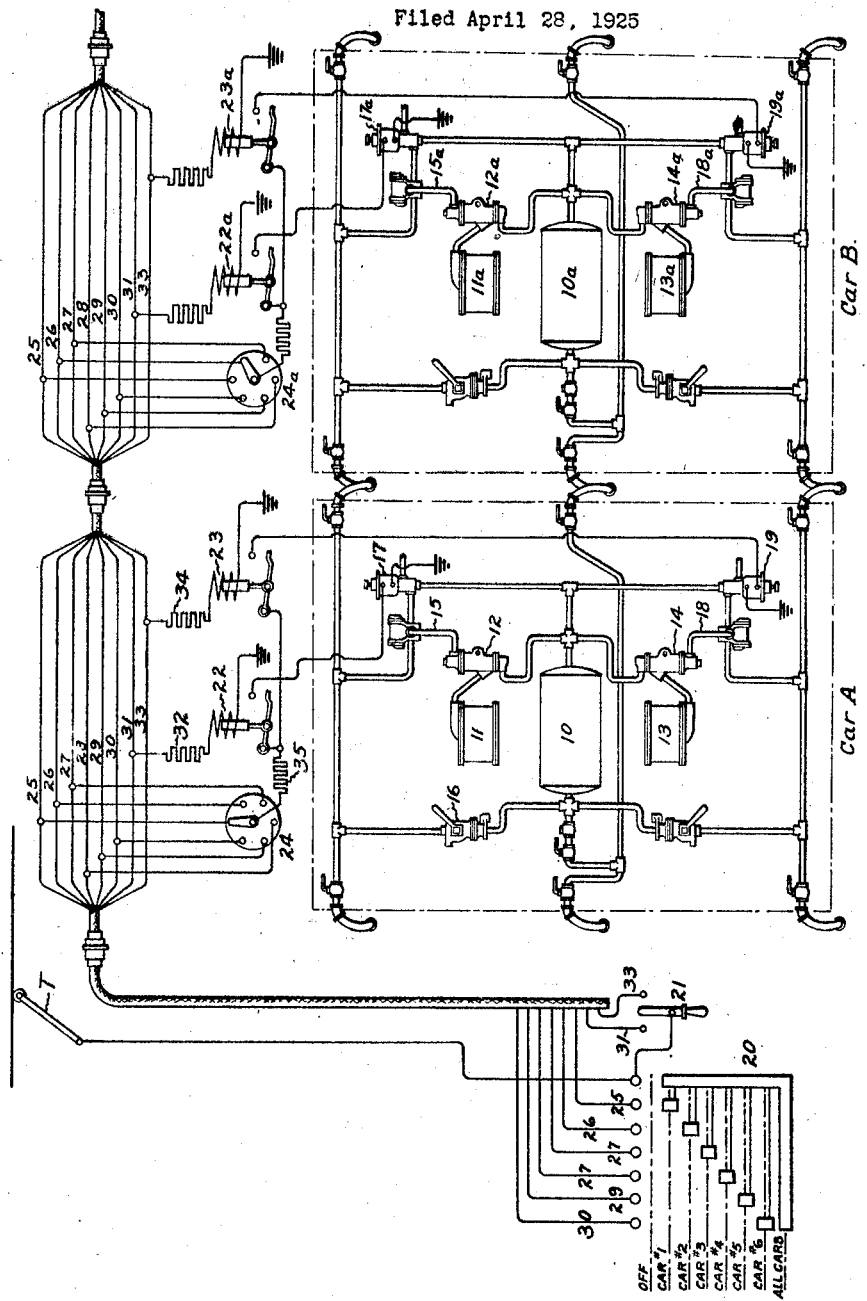

1,555,594

UNITED STATES PATENT OFFICE.

GEORGE MACLOSKIE, OF ERIE, PENNSYLVANIA, ASSIGNOR TO GENERAL ELECTRIC COMPANY, A CORPORATION OF NEW YORK.

CONTROL SYSTEM FOR DUMP CARS.

Application filed April 28, 1925. Serial No. 26,512.

*To all whom it may concern:*

Be it known that I, GEORGE MACLOSKIE, a citizen of the United States, residing at Erie, in the county of Erie, State of Pennsylvania, have invented certain new and useful Improvements in Control Systems for Dump Cars, of which the following is a specification.

This invention relates to the control of dump cars, and more particularly to the control of trains of tilting dump cars which are arranged to be dumped to one side or the other by power means, such as compressed air pistons or the like with which the cars are provided.

The present invention provides an electrical control system for a train of dump cars of the above character whereby the power dumping means with which the cars are provided may be controlled to separately or successively dump the cars to either one side or the other, or all of the cars may be simultaneously dumped in either direction.

Although not limited thereto, the present invention is of particular usefulness in controlling dump car trains employed in handling material in stone crushing plants. By means of the present invention the cars loaded with material may be separately or jointly dumped under the control of the operator of the locomotive which draws the train of dump cars.

In carrying the invention into effect in a preferred form each of the two-way power actuated dump cars is provided with electroresponsive means for controlling the power dumping means so as to selectively dump the car in either direction. A master switch mechanism and electrical connections between the cars under the control of master switch mechanism is provided for the purpose of selectively controlling the energization of the electroresponsive means on each car to effect the separate, successive, or joint dumping of the cars in either direction, depending upon the operation of the master switch mechanism.

In the accompanying drawing, the single figure is a schematic diagram of a dump car control system embodying a preferred form of the invention for the purpose of explaining the principles thereof.

Referring to the drawing, it will be seen that the dump cars A and B are each provided with a compressed air power dumping mechanism of a well known form. The power dumping mechanism on car A comprises essentially an air storage reservoir 10 which is arranged to supply air under pressure to either the left-hand dumping cylinder 11 under the control of the air valve 12, or to the right-hand dumping cylinder 13 under the control of the air valve 14. Briefly, the arrangement and connection of the valve 12 is such that when air pressure is supplied to the pipe 15 through either the manually controlled three way valve 16 or the electroresponsive double beat valve 17, communication between the reservoir 10 and the dump cylinder 11 will be established, and upon exhausting the air pressure in 15 through operation of the manually operated valve 16 or the electroresponsive valve 17 dump cylinder 11 will be disconnected from the reservoir 10 and permitted to exhaust to atmosphere. Since the particular form of air valve 12, as well as the structure of the manual three way valve 16 and the electroresponsive double beat valve 17 are not of the essence of my present invention, no further detailed description thereof is deemed essential as it will be obvious to any one skilled in the art that other suitable forms of valve mechanisms may be provided if desired.

When air pressure from the reservoir 10 is applied to the pipe 18 by operation of the electroresponsive valve 19, the controlling valve 14 will be operated to establish communication between the reservoir 10 and the right-hand dumping cylinder 13. Likewise, when the air pressure is released from pipe 18 under the control of electroresponsive valve 19, the right-hand dumping cylinder 13 will be disconnected from the reservoir 10 and allowed to exhaust to atmosphere. Furthermore, while not shown in the drawing, it will be understood that the car A is provided with suitable mechanism whereby upon operation of the left-hand dumping cylinder 11 the tilting body of car A will be dumped to the right, while upon operation of the right-hand dumping cylinder 13 the tilting body of car A will be dumped to the left.

Car B is provided with an air reservoir $10^a$, a left-hand dumping cylinder $11^a$, a valve $12^a$, a right-hand dumping cylinder $13^a$, a valve $14^a$, and pipes $15^a$ and $18^a$, as well as electroresponsive valves 17ª and 19ª which are constructed and arranged in exactly the same manner as car A. It will be understood that each succeeding car in the dump car train likewise is equipped with power dumping means and electroresponsive means for controlling the same, arranged in a similar manner to the cars A and B, as illustrated in the drawing.

To enable the electroresponsive valves on each car to be selectively controlled in accordance with the present invention, a master controller 20 having an off position and a separate operating position for each of the cars composing the train, as well as an operative position for controlling all of the cars in the train as indicated in the drawing, is arranged to control the energization of a plurality of train conductors which extend between and through the several cars. The two-way master switch 21 also is arranged to control the energization of the train conductors. Car A is provided with a pair of electromagnetic switches 22 and 23 which control the energizing circuits of electroresponsive valves 17 and 19 respectively. Where the car A may be assembled indiscriminately in a train, the selective switch 24 is provided and is connected to the train conductors 25 to 30 as shown. The selective switch 24 is operable to a position corresponding to the position of car A in the train in order to select the proper train conductor to enable the master switch 20 to separately select the car which is to be dumped. The operating winding of electromagnetic switch 22 is connected to the train line 31, preferably through a current limiting resistor 32. In a similar manner, the operating winding of electromagnetic switch 23 is connected to the train line 33 through the current limiting resistor 34.

Car B likewise is provided with a pair of electromagnetic switches 22ª and 23ª for controlling the energizing circuits of electromagnetic valves 17ª and 19ª respectively and a selective switch 24ª is connected and arranged in substantially the same manner as described in connection with car A.

As thus constructed and arranged, the operation of the electric control system embodying my invention in the preferred form illustrated is as follows:

Any one of the cars A and B, as well as the succeeding cars in the train may be selected for dumping by operation of the master controller 20 to the corresponding operating position. Assuming that the controller 20 is operated to the position indicated as "Car #1". In this position only the train wire 25 will be energized from the trolley T. If it should be desired to dump car #1 to the right the two-way switch 21 is moved to the left to connect the train conductor 31 to the trolley T. This serves to energize the operating winding of electromagnetic switch 22. Upon the resulting closure of switch 22 an energizing circuit for the operating winding of the electroresponsive valve 17 is completed from the trolley T through the master switch 20 in the car #1 position, the train conductor 25, the selective switch 24, the resistor 35, the contacts of switch 22 in the closed position, and the winding of electroresponsive valve 17 to ground. Thereupon valve 17 operates to admit air from the cylinder 10 to the controlling valve 12 and the latter in turn operates to establish communication between the reservoir 10 and the operating cylinder 11. The resulting movement of the piston in cylinder 11 serves to dump the tilting body of car A to the right.

If now it should be desired to dump car B in the same direction as car A, the master controller 20 is advanced to the position indicated as "Car #2." This serves to disconnect the train conductor 25 from the trolley T and at the same time to connect the train conductor 26 to the trolley T. Since the operating winding of electromagnetic switch 22ª was energized simultaneously with the switch 22 upon operation of two-position master switch 21 to the left, the switch 22ª will be in the closed position and, hence, upon the connection of train conductor 26 to the trolley T, an energizing circuit for the electroresponsive valve 17ª is completed which may be traced from the trolley T through the master switch 20 in the car #2 position, train conductor 26, selective switch 24ª, contacts of electromagnetic switch 22ª in the closed position and the operating winding of electromagnetic valve 17ª, to ground. The resulting operation of valve 17ª admits air from the reservoir 10ª to the operating cylinder 11ª of car B in the same manner as previously described in connection with car A. Operating cylinder 11ª tilts the body of car B in the same direction as the body of car A was tilted by the operating cylinder 11.

It will be evident that succeeding cars 3, 4, 5, 6, in the train may be separately tilted in the same direction as cars A and B by progressively operating the master controller 20 through the corresponding operating positions.

To simultaneously return the tilting bodies of all the cars to the upright position master controller 20 is operated to the position indicated in the drawing as "All cars" to connect all of the train conductors 25, 26, 27, 28, 29, 30 to the trolley T and the two-position switch 21 is moved to the right to connect the train conductor 33 to the trolley T. Operation of switch 21 simultaneously deenergizes the operating windings of electromagnetic switches 22, 22ª, etc. and then simultaneously energizes the operating windings of electromagnetic switches 23, and 23ª, etc. Upon the resulting closure of switches 23, 23ª, etc., it will be evident that the electroresponsive valves 19, 19ª, and the corresponding valves on the successive cars are energized to permit the operating cylinders 13, 13ª, etc. to receive pressure from the reservoirs 10, 10ª, etc. Through the agency of suitable double acting toggle tilting and locking mechanism not shown in the drawing, but which is well known in the art, the operating cylinders 13, 13ª, etc., function to return the car bodies to the upright position and automatically lock the same therein. In this way, after the cars are dumped to the right the admittance of pressure to the operating cylinders 13, 13ª, etc. serves to right the tilting bodies of the cars without causing the same to dump in the opposite direction.

With the cars in the upright position and the master switch 20 in the position indicated as "All cars", it will be evident that upon operation of two-position switch 21 to the left the electromagnetic switches 22 and 22ª and the corresponding switches on succeeding cars will simultaneously close and establish energizing circuits for the electromagnetic valves 17, 17ª, etc. to simultaneously dump all of the cars in the same direction. With the two-position switch 21 in the off-position in which it is shown, the master controller 20 may be operated to select any car in the train for dumping and the switch 21 then may be operated either to the right or to the left to effect the dumping of the selected car in a corresponding direction.

While I have described a preferred form of my invention in connection with a selective control for a six-car train, it will be evident that the apparatus shown may be modified in various ways and arranged to control a larger or smaller number of cars.

What I claim as new and desire to secure by Letters Patent of the United States, is:—

1. A control system for a train of dump cars, each having power means for dumping the car comprising electroresponsive means on each car for controlling the corresponding power means to dump the car, and means comprising controlling switch mechanism and electrical connections between the cars controlled by said switch mechanism for separately energizing the said electroresponsive means on each car to separately dump the cars.

2. A control system for a train of two-way dump cars, each having power means for dumping the car comprising electroresponsive means on each car for controlling the corresponding power means to dump the car in each direction, and means comprising controlling switch mechanism and electrical connections between the cars controlled by said switch mechanism for energizing the said electroresponsive means on each car to separately dump the cars in either direction.

3. A control system for a train of two-way dump cars, each having power means for dumping a car comprising electroresponsive means on each car for controlling the corresponding power means to dump the car in each direction, and means comprising electrical connections between the cars for selectively energizing the said electroresponsive means on each car to separately or jointly dump the cars in each direction.

4. A control system for a train of dump cars, each having power means for dumping the car comprising electroresponsive means on each car for controlling the corresponding power means to dump the car, and means for controlling the said electroresponsive means to separately dump the cars comprising a controller for selecting the car to be dumped and a second controller cooperating therewith for jointly controlling the energizing circuit of the electroresponsive means on the selected car.

5. A control system for a train of two-way dump cars, each having power means for dumping the car comprising electroresponsive means on each car for controlling the corresponding power means to dump the car in each direction, and means for controlling the said electroresponsive means to separately dump the cars in either direction comprising a controller for selecting the car to be dumped and a second controller for determining the direction in which the selected car is dumped.

6. A control system for a train of two-way dump cars each having power means for dumping the car, comprising electroresponsive means on each car for controlling the corresponding power means to dump the car in each direction, and means for controlling the said electroresponsive means to separately or jointly dump the cars in either direction, comprising a controller operable to select any one or all of the cars to be dumped, and a second controller for determining the direction in which the selected car or cars are dumped.

7. A control system for a train of two-way dump cars, each having electroresponsive means for dumping the car, comprising a pair of electroresponsive switches on each car, the first for controlling the corresponding electroresponsive dumping means to dump the car in one direction and the second for controlling the said means to dump the car in the other direction, a controller and connections controlled thereby for simultaneously operating the said first or second switches on each car, and a master controller having a separate operating position for each car and connected to cooperate with the electroresponsive switches on the corresponding car to control the energization of the corresponding electroresponsive dumping means to separately dump the cars in either direction.

8. A control system for a train of two-way dump cars each having electroresponsive means for dumping the car comprising a pair of electroresponsive switches on each car, the first for controlling the corresponding electroresponsive dumping means to dump the car in one direction and the second for controlling the said means to dump the car in the other direction, a controller and connections between the cars controlled by the said controller for selectively operating the said first or the said second switches on each car simultaneously, a master controller having a plurality of operating positions, and connections whereby the said controller cooperates with the electroresponsive switches on the corresponding cars to control the energization of the corresponding electroresponsive dumping means to separately or jointly dump the cars in each direction.

9. The combination of a plurality of dump cars adapted to be assembled indiscriminately into a train, each car having power means for dumping the car and electroresponsive means for controlling the corresponding power means, of means including a master switch mechanism and a selective switch mechanism on each car operable to a position corresponding to the position of the car in the train for separately controlling the electroresponsive means on each car.

10. The combination of a plurality of dump cars adapted to be assembled indiscriminately into a train, each of said cars having power means for dumping the car and electroresponsive means for controlling the corresponding power means to dump the car, of means including a master controller, electrical connections between the cars, and a selective switch on each car operable to a position corresponding to the position of the car in the train for controlling the said electroresponsive means to successively dump the cars in a train.

11. The combination of a plurality of two-way dump cars adapted to be assembled indiscriminately into a train and each having power means for dumping the car and electroresponsive means for controlling the corresponding power means to dump the car in each direction, of means including master switch mechanism, electrical connections between the cars controlled by said master switch mechanism, and a selective switch mechanism on each car operable to a position corresponding to the position of the car in the train for controlling the said electroresponsive means to successively dump the cars in a train in either direction.

12. The combination of a plurality of two-way dump cars adapted to be assembled indiscriminately into a train and each having power means for dumping the car and a pair of separately operable electromagnetic switches, the first for controlling the corresponding power means to dump the car in one direction and the second for controlling the said means to dump the car in the other direction, a controller and connections between the cars controlled by said controller for simultaneously operating the said first or said second switches on each car, a selective switch on each car operable to a position corresponding to the position of the car in the train, and a master controller having a separate operating position for each car and connected to cooperate with said selective switches and said electroresponsive switches to control the power means to separately and successively dump the cars in a train in either direction.

In witness whereof, I have hereunto set my hand this 25th day of April 1925.

GEORGE MACLOSKIE.